United States Patent
Bender (10) Patent No.: US 9,971,819 B2
(45) Date of Patent: May 15, 2018

(54) USING CLOUD PROCESSING TO INTEGRATE ETL INTO AN ANALYTIC REPORTING MECHANISM

(71) Applicant: International Business Machines Corporation, Armonk, NY (US)

(72) Inventor: Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 14/822,338

(22) Filed: Aug. 10, 2015

(65) Prior Publication Data

US 2017/0046409 A1    Feb. 16, 2017

(51) Int. Cl.
*G06F 17/30* (2006.01)

(52) U.S. Cl.
CPC .. *G06F 17/30563* (2013.01); *G06F 17/30477* (2013.01)

(58) Field of Classification Search
CPC combination set(s) only.
See application file for complete search history.

(56) References Cited

U.S. PATENT DOCUMENTS

| | | | |
|---|---|---|---|
| 7,870,016 B2 * | 1/2011 | Fazal | G06Q 10/0637 705/7.36 |
| 8,401,993 B2 | 3/2013 | Kumar et al. | |
| 2008/0183747 A1 * | 7/2008 | Mangipudi | G06F 17/30557 |
| 2010/0153430 A1 * | 6/2010 | Mordvinov | G06F 17/30436 707/769 |
| 2011/0251874 A1 * | 10/2011 | Banthia | G06Q 30/02 705/7.31 |
| 2012/0054345 A1 * | 3/2012 | Sahu | G06F 8/61 709/226 |
| 2013/0030858 A1 * | 1/2013 | Gupta | G06Q 10/0631 705/7.23 |
| 2014/0229628 A1 | 8/2014 | Mandal | |
| 2015/0046899 A1 | 2/2015 | Ganapathy | |

FOREIGN PATENT DOCUMENTS

CA    2648210    7/2009

OTHER PUBLICATIONS

Creating, Executing, And Embedding Hierarchical Data Transformations Using Cloud Services, IP.com No. 000231454, IP.com Electronic Publication: Sep. 30, 2013, 3 pages.
An extensible, scalable, optimized multithreaded data loading framework for software applications, IP.com No. 000240374, IP.com Electronic Publication: Jan. 28, 2015, 8 pages.

* cited by examiner

*Primary Examiner* — Etienne Leroux
(74) *Attorney, Agent, or Firm* — Schmeiser, Olsen & Watts, LLP; Michael Petrocelli (57) ABSTRACT

A method and associated systems for using cloud processing to integrate ETL into an analytic reporting mechanism. A computerized reporting tool receives information from which it infers an information query. The tool determines whether existing reusable ETL code may be used in order to respond to such an inferred query. If not, the tool modifies existing instructions or generates new instructions that may be reused when responding to future queries. The system provisions a virtual computing environment on a cloud-computing platform and populates the environment with virtual components that run the reusable ETL code and then stream the resulting transformed datasets to the tool. The reporting tool then uses the returned datasets to generate or update an animated or real-time report.

17 Claims, 2 Drawing Sheets

USING CLOUD PROCESSING TO INTEGRATE ETL INTO AN ANALYTIC REPORTING MECHANISM

TECHNICAL FIELD

This invention relates to automatically generating reports.

BACKGROUND

A computerized reporting tool may need to extract data from multiple, heterogeneous data sources when producing a complex, animated, continuously updated, or interactive report, such as a "dashboard." This task can be challenging when data sources are large or structurally incompatible. In some cases, reconciling such data may require launching an ETL (Extract/Transform/Load) code or computer program in order to extract datasets from such sources, format those datasets into compatible forms, and combine them into a manageable format. ETL tools have been used in other fields to reconcile and combine disparate data sources into a standardized format that may then be stored in a data warehouse, but such functionality does not exist in a standalone reporting tool.

BRIEF SUMMARY

A first embodiment of the present invention provides a computerized ETL-based reporting tool comprising a processor, a memory coupled to the processor, and a computer-readable hardware storage device coupled to the processor, the storage device containing program code for a reporting tool configured to be run by the processor via the memory to implement a method for generating an ETL-based report, the method comprising:

the reporting tool inferring a data query as a function of receiving information input from a user;

the reporting tool identifying one or more data sources containing retrieved data needed to respond to the inferred query;

the reporting tool selecting a set of Extraction, Transform, and Load (ETL) code;

the reporting tool launching the ETL code, where the ETL code extracts, transforms and loads the retrieved data from the one or more data sources, such that the retrieved data is transformed into at least one dataset;

the reporting tool receiving, as a function of the ETL code, the at least one dataset; and the reporting tool creating a report as a function of the at least one dataset.

A second embodiment of the present invention provides a method for generating an ETL-based report, the method comprising:

a computerized ETL-based reporting tool accepting information input from a user, where the computerized ETL-based reporting tool comprises a processor, a memory coupled to the processor, and a computer-readable hardware storage device coupled to the processor, the storage device containing program code for the ETL-based reporting tool configured to be run by the processor via the memory to implement the method for generating the ETL-based report;

the reporting tool inferring a data query as a function of receiving the information input of the user;

the reporting tool identifying one or more data sources containing retrieved data needed to respond to the inferred query;

the reporting tool selecting a set of Extraction, Transform, and Load (ETL) code;

the reporting tool launching the ETL code, where the ETL code extracts, transforms and loads the retrieved data from the one or more data sources, such that the retrieved data is transformed into at least one dataset;

the reporting tool receiving, as a function of the ETL code, the at least one dataset; and the reporting tool creating a report as a function of the at least one dataset.

A third embodiment of the present invention provides a computer program product, comprising a computer-readable hardware storage device having a computer-readable program code stored therein, the program code configured to be executed by a computerized ETL-based reporting tool comprising a processor, a memory coupled to the processor, and a computer-readable hardware storage device coupled to the processor, the storage device containing program code for the reporting tool configured to be run by the processor via the memory to implement a method for generating an ETL-based report, the method comprising:

the reporting tool inferring a data query as a function of receiving information input from a user;

the reporting tool identifying one or more data sources containing retrieved data needed to respond to the inferred query;

the reporting tool selecting a set of Extraction, Transform, and Load (ETL) code;

the reporting tool launching the ETL code, where the ETL code extracts, transforms and loads the retrieved data from the one or more data sources, such that the retrieved data is transformed into at least one dataset;

the reporting tool receiving, as a function of the ETL code, the at least one dataset; and the reporting tool creating a report as a function of the at least one dataset.

DETAILED DESCRIPTION

Existing methodologies generally organize reporting functions as a late-stage process that is facilitated by earlier data-transformation operations. These earlier data-transformation operations transform data into a form that may be understood by a reporting tool when presenting that data in a structured report. Embodiments of the present invention invert such methodologies by allowing a reporting mechanism to create its own data-transformation requirements and then use those requirements to configure and perform ETL operations that are tailored to the needs of the report. In other words, the reporting tool itself may drive the transformation of the data instead of the data transformation driving the report.

Such an approach may create a need to for an ETL-based computing system to handle a scenario in which multiple users or applications request reports that require similar data transformation to be performed. This scenario may even include multiple report requests that may need to be performed in real time or near real time. Embodiments of the current application address this concern by provisioning a distinct and separate set of resources to each of the multiple report requests, for example, using cloud-computing functionality to create a distinct database instance for each requested report, eliminating a possibility of two report requests corrupting each other's data, competing for the same resources, or otherwise conflicting.

This present invention is a system and method that integrates resource allocation management through local, network or cloud-computing in conjunction with ETL (Extract/Transform/Load) functionality into a computerized reporting tool. ETL tools use complex rules to extract heterogeneous sets of data from multiple sources, transform that data into a standardized or otherwise predetermined format, and store the transformed data in an information repository as a flat file, a relational database record, or another known data structure.

ETL tools are generally complex, standalone computerized applications that may consume significant resources or search through large amounts of data stored at remote information repositories. They typically support database or data-warehousing applications by aggregating data from multiple sources that may not be accessible to a database system. Such ETL functionality may be especially useful when a step of transforming retrieved data into a form that may be accessed or understood by a database system would require processing too complex to be performed by the database system.

Embodiments of the present invention make it possible to incorporate ETL or ETL-like functionality into a real-time, interactive, or batch reporting tool by: automatically generating a set of ETL code as a function of a characteristic of a requested report or related query; streamlining resource requirements needed to search or retrieve data from remote sources by applying a filter, based on requirements of the requested report or related query, that reduces an amount of data that must be reviewed or retrieved; by running the ETL job in a virtualized cloud-computing environment that is dynamically provisioned and deprovisioned by the reporting tool; and by streaming or otherwise transferring the transformed data results of the ETL job back to the reporting tool from the short-lived computing environment that has been allocated resources such as a cloud-computing environment, allowing resources allocated to perform the ETL task to be quickly recovered and avoiding conflicts between simultaneous report requests that may need to access or transform the same remotely stored data. Some embodiments of the reporting tool may be an all-one-solution allowing for the reporting tool infer a query, select, generate or modify ETL code as a function of the query, apply additional filters to limit the retrieved data from the query to a smaller subset of data, allocate resources to create a computing environment for running the ETL code, deprovisioning resources and reporting the data to the user. In short, some embodiments of the reporting tool may automatically collect data, define a space for performing ETL functions, report the data and then delete the space utilized for performing the ETL functions after completing the designated task.

Figure 1:
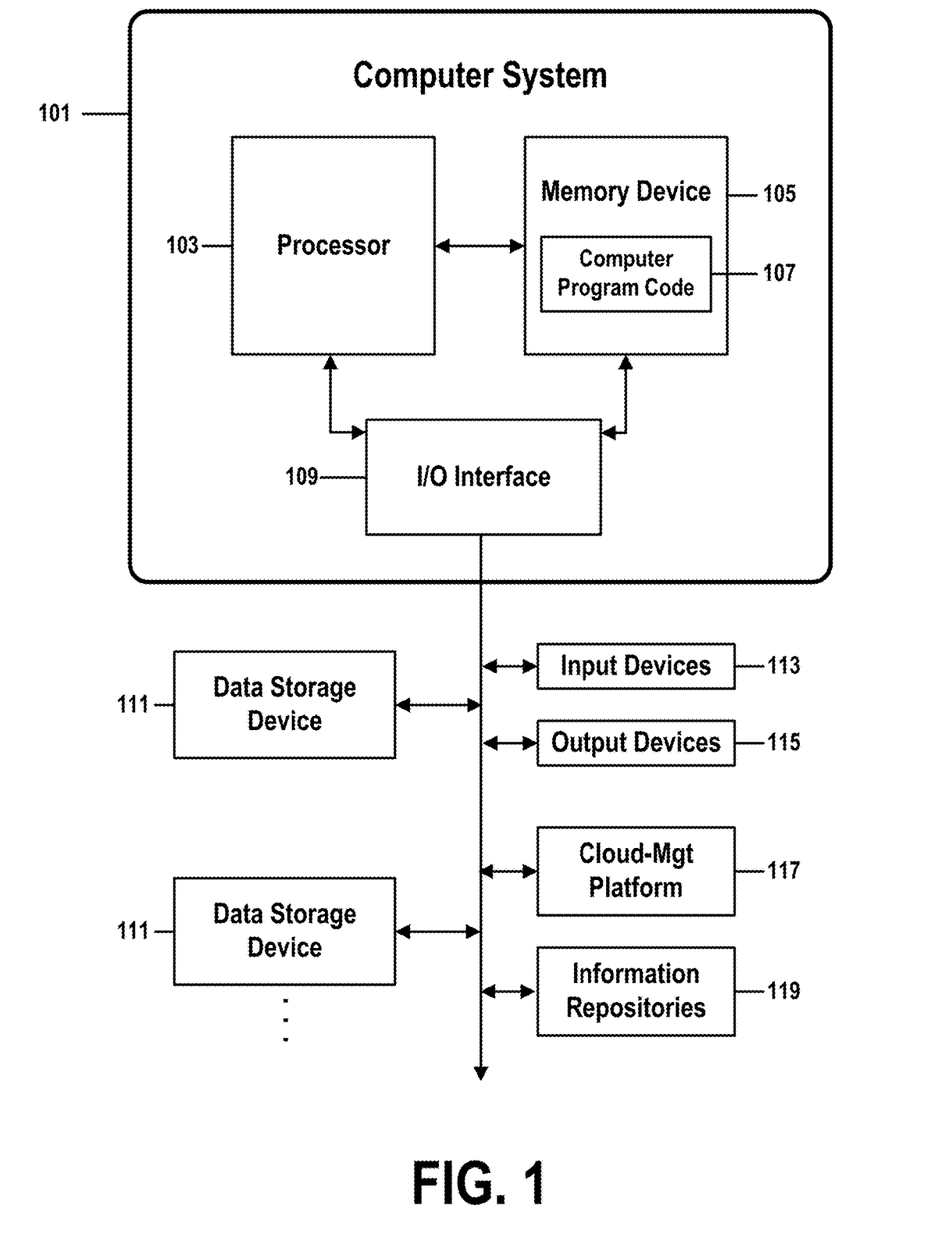
FIG. 1 depicts an embodiment of a structure of a computer system and computer program code that may be used to implement a method for generating an ETL-based analytic report in accordance with embodiments of the present disclosure.

FIG. 1 shows a structure of a computer system and computer program code that may be used to implement a method for generating an ETL-based analytic report in accordance with embodiments of the present invention. FIG. 1 refers to objects 101-119.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111, one or more I/O devices 113 and 115, one or more cloud-management platforms or network-management consoles 117, and one or more remote or local information repositories 119.

This architecture may vary slightly in some embodiments. Information repositories 119 may, for example, be accessible to the computer system 101 only indirectly through local- or wide-area computer networks connected to I/O interface 109. In another example, the computer system 101 may not have any access to one or more of the information repositories 119, instead receiving ETL-transformed data from a cloud-computing environment, provisioned or managed by cloud-management platform 117, which had retrieved the data from one or more repositories 119.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for generating an ETL-based analytic report in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for generating an ETL-based analytic report.

Any of the components of the present invention could be created, integrated, hosted, maintained, deployed, managed, serviced, supported, etc. by a service provider who offers to facilitate a method for generating an ETL-based analytic report. Thus the present invention discloses a process for deploying or integrating computing infrastructure, comprising integrating computer-readable code into the computer system 101, wherein the code in combination with the computer system 101 is capable of performing a method for generating an ETL-based analytic report.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for generating an ETL-based analytic report, including program code 107 for a reporting tool, the program code 107 may be deployed by manually loading the program code 107 directly into client, server, and proxy computers (not shown) by loading the program code 107 into a computer-readable storage medium (e.g., computer data storage device 111). Program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating an ETL-based analytic report using a computerized ETL-based reporting tool may be integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number may be upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers may be upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
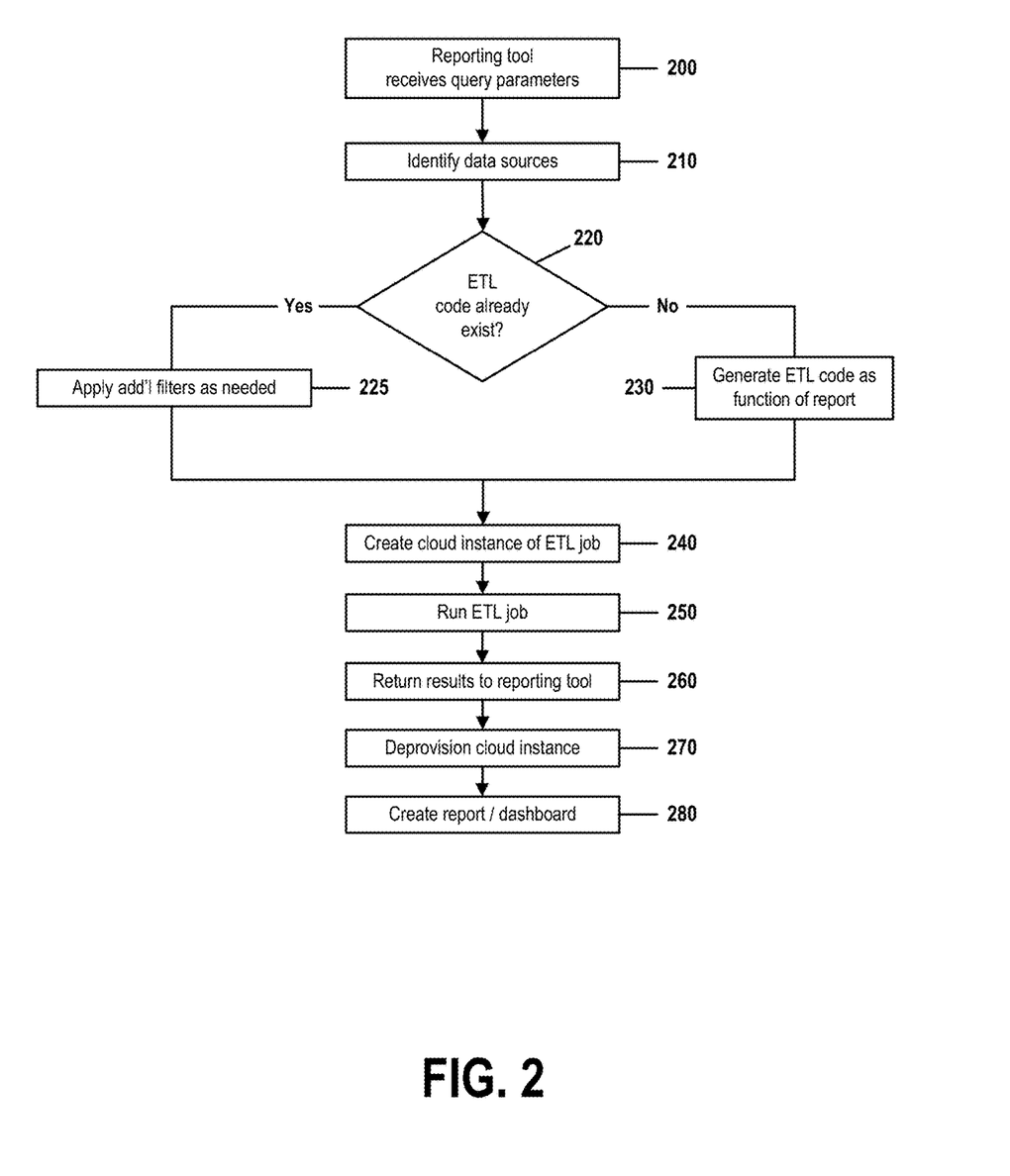
FIG. 2 depicts a top-level flow chart of an embodiment of a method for generating an ETL-based analytic report using a computerized ETL-based reporting tool.

FIG. 2 depicts a top-level flow chart that provides an overview of an embodiment of a method for generating an ETL-based report in which a set of ETL code may be integrated into an analytics-based reporting mechanism, in accordance with the steps and features of the embodiments described below. FIG. 2 depicts elements identified by reference numbers 200-280. Embodiments of the present invention may implement procedures that vary somewhat from those described here in FIG. 2. Certain steps may, for example, be omitted in some cases, or may be performed in slightly different order. Because the figures show only likely examples of a typical embodiment, they should not be construed to limit all embodiments of the present invention to methods that precisely match those of the examples.

Some embodiments of the present disclosure may incorporate a method for generating an ETL-based report that can be initiated by a user utilizing a computing system 101 having the computer program code 107 of an ETL-aware reporting tool loaded in the memory device 105 of the computing device 101.

In some embodiments, the reporting tool may include hardware, software, virtual or physical interfaces, networking components infrastructure components, or other entities that may allow the reporting tool to communicate directly or indirectly with a set of locally stored or remotely accessible data sources. These data sources may comprise a combination of software applications, hardware systems, networked resources, virtual or physical resources, public or private databases, flat files, unstructured files or other information repositories, web services including social media services or platforms, messaging services or other types of sources known to those skilled in the art.

A user may request that the reporting tool provide, present, display and/or organize the information and data sources accessible to the reporting tool in the form of a report. The user may initiate the generation of the ETL-based report by transmitting, through electronic means known to those skilled in the art, information to the reporting tool. The information transmitted to the reporting tool by the user may provide the reporting tool with one or more parameters for identifying information relevant to the user's request.

Thus, in step 200 of the embodiments depicted in FIG. 2, the reporting tool receiving the information through electronic means may accept the receipt of the information and infer from the received information, that one or more users or front-end software, hardware, or other computerized or electronic entities have made a query requesting, directly or indirectly, that the reporting tool provide and/or display for the user, additional information accessible to the reporting tool. This step may include the reporting tool inferring a data query as a function of receiving the information input from a user.

In some embodiments, the information received by the reporting tool may include search terms, one or more logical operators, conditional factors, data-source identifiers and data types. In some embodiments, these data types may in include strings, long values, Boolean values, floating point values, universally unique identifiers (UUID), arrays, or objects. The information received by the reporting tool may direct the reporting tool to use one or more specific data sources, parameters defining how and which user system or platform the retrieved data from the data sources should be forwarded to. Furthermore, in some embodiments, the information transmitted to the reporting tool via electronic means may also include parameters identifying information about the user submitting the inferred query, including but not limited to identifying personal information or login credentials, software module, network, system or location information about the entity that has generated or requested the query.

In some embodiments, the information provided to the reporting tool may further include additional rules or instructions, such as metadata, that may identify a data format or a data structure associated with information being provided to the reporting tool as part of the query being inferred by the reporting tool. Embodiments of this provided information, including data and metadata, may be used by the reporting tool to determine how the reporting tool should interpret, perform, or otherwise respond to a request for data by the user.

In some embodiments, the reporting tool may be a standalone software module that may interact directly with the user. In other embodiments, a software module for the reporting tool may be integrated into a software package or software suite, including analytic software package, business-intelligence, customer relationship-management, database-management, or other virtual or real information-processing system or information repository.

In some embodiments, the reporting tool may be an independent, physical or virtualized entity which may be comprised of specialized hardware or software components tailored to perform the method shown in FIG. 2. In some embodiments, the reporting tool may be integrated into or may communicate with one or more hardware or software components of a network. Examples of hardware components of a network may include gateways, routers, switches, bridges, hubs and repeaters, including hybrid network devices such as multilayer switches, protocol converters, bridge routers, proxy servers, firewalls, network address translators, mutiplexers, network interface controllers, wireless network interface controllers, modems, ISDN terminal adapters, line drivers, wireless access points and networking cables such as Ethernet cables. Software components on the other hand may include network interface cards (NIC), PC cards, servers, operating systems (OS) such as a network operating system (NOS) and PIMs.

These hardware and software components may include capabilities that may allow the reporting tool to communicate over one or more different types of networks. Examples of the networks that the reporting tool may communicate over may include, but is not limited to, a cloud-computing environment (including a public cloud, private cloud, or community cloud), an enterprise private network (EPN), a local area network (LAN), a wide-area network (WAN), personal area network (PAN), storage area network (SAN), virtual private network (VPN) a wireless or distributed network, peer-to-peer network, shared data network or any other type of real or virtual network platform known to those skilled in the art.

In some embodiments, the reporting tool may comprise multiple modules which may allow the reporting tool to perform concurrent, simultaneous, or parallel processing on one or more platforms at a time, in accordance with a distributed, vector-processing, multiprocessing, or other computing methodology. Embodiments of the reporting tool may also comprise multiple modules that allow the tool to receive and respond simultaneously, nearly simultaneously, or concurrently to multiple queries or inferred queries at any given time information is received by the reporting tool.

In some embodiments, some or all of the information received in step 200 by the reporting tool may comprise data that allows the reporting tool to construct an SQL query, such as a formatted, natural-language, or freeform set of data requirements that may be interpreted and understood by means known to those skilled in the arts of analytics, artificial intelligence, database administration, or other similar fields. Other types of information received in this step may include a combination of a select query which may be a simple data retrieval query, a parameter query having sets of conditions or variables referring to one or more pieces of data (arguments), a cross-tab query having a matrix of data by plotting one field against one or more other fields, or an action query which may ask for additional operations on the data including insertion, updating or deletion and combinations of queries thereof.

In step 210, some embodiments of the reporting tool, in response to the inferred query, may identify one or more data sources that the reporting tool may use to fulfill a query inferred from information received in step 200. Such data sources may include data retrieved from a combination of applications; web services; databases; locally or remotely stored datasets; spreadsheets; flat files; unstructured files and data sources, such as Web pages, emails, and unstructured documents; mainframe computers; servers; networked workstations; messaging services; data streams; hard-coded data; business systems such as on-line transactional processing (OLTP) systems; external organizations that make available third-party data, including market-survey data, market-segmentation data, or financial-ratings; or any other data source known by those skilled in the art.

In step 220, the reporting tool may attempt to identify an existing set of extraction, transformation, and load (ETL) instructions, rules, or operations that may be used to perform one or more ETL functions required to satisfy the query that was identified, received, or inferred in step 200 or 210 as a function of information received in step 200. If the reporting tool determines in step 220, that an existing set of ETL instruction already exists, the reporting tool may select the ETL code capable of fulfilling the query. In some embodiments, the method of FIG. 2 may further perform step 225, applying additional filters to as needed to fulfill the query, while at the same time reducing or limiting the amount of data from the identified data sources in step 220 that will be subjected to the ETL functions performed on the data. Otherwise, the reporting tool may perform step 230 to generate ETL code or modify existing ETL code as a function of the report. In either case, the method may continue with steps 240-280.

Embodiments of the present invention may process data that the reporting tool will request and receive from one or more of the data sources identified in step 210. The processing of the data may include first transforming that data into one or more datasets, and then storing at least one of these datasets in one or more local, remote or network accessible data repositories, such as a database or a data warehouse. In order to perform this operation, embodiments of the reporting tool may perform one or more extraction, transformation, and load (ETL) functions that may each be represented as a set of ETL code, rules, or operations.

In some embodiments, such ETL functions may be integrated or embedded into the reporting tool, while in other embodiments, the ETL functions may be performed, at the request of the reporting tool, by one or more programs or applications that are distinct from the reporting tool itself. The ETL functions, instructions, rules, and operations may be defined, represented, and implemented through means known to those skilled in the art.

In some cases, the reporting tool may be able to access one or more pre-existing, previously-generated, or pre-programmed sets of ETL code, rules, or operations capable of satisfying the query identified or inferred in step 210. (Such code, rules, or operations will be identified in this document as "ETL code" for performing a requested "ETL job" in response to the query). But in other cases, the reporting tool may not have access to pre-existing, previously-generated, or pre-programmed ETL code. This may occur when the tool is not able to retrieve or reuse existing ETL code, or it may occur because no such code exists. Under conditions where the reporting tool cannot access existing ETL code suitable for processing data retrieved from the identified data sources into one or more datasets capable of satisfying the identified or inferred query, a new or modified set of ETL code may be generated and written by the reporting tool, or by a module accessed by the reporting tool. This code generating or modifying step may be performed as a function of a characteristic of a desired report, or as a function of a requirement of the report identified by information received in step 200.

In some embodiments, a set of pre-defined or preprogrammed rules for selecting a set of ETL code may identify to the reporting tool that none of the currently available ETL code is suitable for responding to the identified or inferred query. In such a case, the reporting tool itself may, in step 230 automatically generate, or cause to be generated, a new set of ETL code or a modified set of ETL code from existing ETL code, that may perform a required ETL job in a manner suitable to the parameters of the query.

Step 225 may be performed by the reporting tool in some embodiments. For example, if the tool, in step 220, determines that it can access existing ETL code for performing the ETL job necessary to satisfy the query. In such cases, the tool may select the appropriate code. In some embodiments, this step of selecting appropriate ETL code may further include a step of selecting and applying one or more additional filters to the data sources identified in step 210 or to data stored in those sources. These additional filters may be used for optimizing, streamlining, increasing the efficiency and/or accuracy of the ETL job by reducing the amount of data that will be processed by the ETL job in step 250. Embodiments of the reporting tool may apply such a filter to the data. A filter may accept certain types of data as input, transform the data and then output the transformed data in accordance with the filter being applied. For example, the filter may be a specific pattern or method for organizing data, where only data that matches the pattern or organizational structure is allowed to pass through the filter. Such a filter may be implemented as a stand-alone program or as a module integrated into the functionality of the reporting tool, or it may be implemented as computer code, embedded, for example, within the ETL code. Other types of implementations are possible, in accordance with to software or computer techniques and technologies known to those skilled in the art.

A selection of available filters may be a function of the types of data sources available to the reporting tool or of the types of data to be retrieved. Filters may, for example, be able to limit data as a function of specific values, ranges of values, dates, or times. Deduplication filters may remove redundant results retrieved from multiple data sources or a data source having multiple redundant entries. Other types of filters may cause data to be removed, excluded or not considered as a function of manually entered or automatically identified keywords, as a function of text strings, or as a function of a file type. One or more of the available filters may conform to any other standard or convention known by those skilled in the art. For example, in some embodiments, the reporting tool may, in step 225, may apply additional filters that reduce or limit a number of considered data sources, or reduce or limit consideration of certain data in one or more data sources, by limiting the retrieval of the data to specific data sources.

In some embodiments, the reporting tool may, in step 225, apply additional filters that reduce or limit consideration of certain data stored in or accessible from one or more data sources by limiting retrieved data to certain types of data stored in certain data sources. Such a filter might, for example, may filter out data accessible from a messaging service, data received from a particular mainframe computer or from any mainframe computer, or information contained in unstructured files or Web sites. In another example, a date filter may be applied to prevent the retrieval of data stored in a particular data source when that data does not fall within a range of dates deemed to be relevant to the query.

Step 230 is performed by the reporting tool if the tool, in step 220, determines that it cannot access existing ETL code for performing the ETL job necessary to satisfy the query. In such cases, the tool here may generate or modify the appropriate code as a function of information received in step 200, of the query inferred or identified by the information received in step 200, or of predefined or embedded rules or instructions. In some cases, this ETL code-generation or code-modification task may be at least partly controlled by a predefined script or a set of ETL code-generation instructions or rules.

In some embodiments, the reporting tool may in step 230 request that a third-party program or application generate a set of ETL code appropriate for satisfying the inferred or identified query. Such generated ETL code may then be accessed and used by the reporting tool to satisfy the query.

In other embodiments, the reporting tool, rather than automatically generating new ETL code for responding to the query, may instead present or ask the requesting user, application, or other entity to select, transmit, identify, modify or generate ETL code appropriate for performing the ETL job necessary to satisfy the query. Each ETL instruction contained in such ETL code may then be saved or stored by the reporting tool in a storage device or memory device in communication with the reporting tool, or in another type of data-storage device known to those skilled in the art. Once saved or stored, ETL code may be reused by the reporting tool during a future performance of a method of FIG. 2.

In some embodiments, once the ETL code has been selected, generated or modified, the ETL code may be inserted or compiled into a script. A script may be a list of commands that are launched by a program, program module or scripting engine. While the description below describes running the code as a script, it is not intended to limit the means through which the code may be run. For the purposes of simplifying the disclosure, this application describes running the code as a script, however it should be understood that the ETL code may be run without integrating the code into a script. Instead the ETL code may be run by a program or the reporting tool may have integrated features or modules for running the ETL code without having to place the ETL code into a script. Scripts or other programs capable of running the ETL code may be used for automating processes on a computing device, such as an embodiment of the ETL-based reporting tool of the current disclosure. In some embodiments, a script may be used for running processes or automating tasks. The ETL code may be inserted or compiled into an ETL script in some embodiments. Upon launching ETL code that may be contained in the ETL script, the launching program, program module, or scripting engine may automatically perform a list of commands, instructions, or functions identified by the ETL code, including a step of applying one or more ETL functions to one or more of the data sources.

In some embodiments, the program, programming module or scripting engine may be the reporting tool itself, which may have integrated features for generating and running scripts from the selected, generated or modified ETL code. In other embodiments, the program or scripting engine launching and running the ETL script may be a separate program or scripting engine such as Scriptella, an open source ETL and scripting tool.

Some embodiments of the reporting tool and methods for generating an ETL-based report may include steps for provisioning an instance of a computing environment for the ETL code to be launched and perform the ETL functions on the data retrieved, into a dataset, by the reporting tool. In step 240, the reporting tool may provision, or cause another entity to provision, real, virtual, local, networked or cloud-based resources for the purpose of performing the ETL job within the instance of the computing environment. The step of provisioning dedicated resources to each ETL job may reduce a risk of job failure due to insufficient resources or data corruption related to conflicts that may arise from shared resource allocations. For example, in some scenarios, multiple queries or inferred queries may be performed that request the same or similar data. Instead of sharing the retrieved data from the identified data sources for each ETL job, the reporting tool may instead provide a distinct set of retrieved data to each ETL job's provisioned computing environment, even when more than one ETL job requires use of the same data.

In some embodiments, the reporting tool may transmit, stream or send data from the identified data sources of step 210 to an instance of the computing environment provisioned by the ETL based computing system. In some embodiments, each ETL job runs within its own provisioned environment, and is given access to its own dedicated resources within that environment. Having specifically allocated and dedicated resources provided to each computing environment instance may prevent multiple ETL jobs from inadvertently attempting to perform an ETL function on a same data element simultaneously, which may result in errors, job failures or data corruption. Transmitting, streaming or sending the data to a specifically provisioned environment may allow a first ETL job to be performed without interfering with or causing interference to a second ETL job being performed simultaneously or concurrently with the first ETL job.

The step of provisioning an environment or instance for the ETL job to perform and launch the ETL code may be beneficial in situations where a computing environment allows one or more ETL jobs to be performed simultaneously or nearly simultaneously. In the exemplary embodiment, each ETL job may be performed in a specific instance of a cloud-based network by creating one or more virtual machines (VMs) with allocated resources to support the VMs. This process may be performed in any manner known to those skilled in the art, including classic provisioning, advanced provisioning (resources provided upon contract/service signup), dynamic provisioning (a requesting application, such as the reporting tool, is provided resources at run time) and user self-provisioning (a user requests and pays for resources as they are need). In other embodiments, a step of provisioning resources to each cloud environment, instance of a virtual machine, or other dynamically allocated computing environment, infrastructure, or resource may be performed using a cloud-bursting method. Under the cloud-bursting method, the ETL job may be scheduled to be performed by the reporting tool in a private cloud or data center. Subsequently, if such a private cloud has resources insufficient to complete the ETL job, the cloud-management platform may respond by requesting that additional resources be provisioned from a publically available cloud or another private cloud.

In step 250, the resources provisioned in step 240 run the ETL job in response to conditions, passed parameters, configuration settings, or other information provided by the reporting tool in step 240. The step of running the ETL job may include launching the ETL code to perform a series of commands in accordance with the ETL code selected, modified or generated by the reporting tool. Launching the ETL script code may proceed to extract, transform and load the data retrieved from one or more data sources identified in step 210 within the provisioned computing environment of step 240, such that the retrieved data is transformed into at least one dataset. Here, a dataset may be any structured or unstructured set of data that may be derived by the ETL job from data originally retrieved from one or more of the extrinsic data sources.

A step of extraction may be defined as a process of reading the data retrieved from the data sources. A transformation step, on the other hand, may include converting or migrating extracted data from a native, raw, or previous form or location within a data source, to a form or location that may allow the data to be placed into a single dataset alongside other pieces of extracted data. The transformation function may occur by using rules, lookup tables, staging tables or by combining retrieved data with other retrieved data.

A dataset may include a single database having a database entry for each piece of extracted data, thus allowing the reporting tool to more easily identify and access information stored in the dataset. In some embodiments, the reporting tool may store a resulting dataset in a data warehouse or a data mart. In other embodiments, the reporting tool may generate a dataset by simply converting data retrieved from a data source from one format type to another. Once data is transformed, the Load function of an ETL job may be a process wherein the transformed data is written into at least one dataset.

In step 260, once one or more datasets have been loaded by the ETL code within the provisioned environment, the reporting tool may request that the loaded datasets be made available to the reporting tool. In some embodiments, an act of sending a dataset from a provisioned environment to the reporting tool may be performed as a function of the ETL code. In some embodiments, ETL code comprised by an ETL script may include a command instructing the provisioned environment to send at least one dataset from the provisioned environment to the reporting tool. In other embodiments, the reporting tool may receive notification that a dataset has finished loading and, subsequently, the reporting tool, a module of the reporting tool, or a user of the reporting tool may send a request to the provisioned environment to return the results of the query to the reporting tool in the form of the dataset.

In some embodiments, the step of the reporting tool receiving a dataset from the provisioned environment may be performed by streaming the loaded dataset from the provisioned environment, or from a storage location to which the ETL job had loaded the dataset in step 250, to the reporting tool. In embodiments where the dataset is streamed from the provisioned environment to the reporting tool, the reporting tool may receive the data and report the information contained within the dataset in real time.

In step 270, once the dataset has been finished loading and the results have been returned to the reporting tool as described in step 260, the reporting tool may send a request to the provisioned environment, or to the hardware or software managing the provisioned environment, to deprovision the environment. By deprovisioning the environment that previously contained the launched ETL code, the resources of the deprovisioned environment may be reallocated to better respond to a subsequent query or inferred query. For example, in an embodiment where the provisioned environment is a virtual machine provisioned in a cloud network, the cloud network may remove the instance and reallocate the resources previously allocated to that particular instance to other instances within the cloud network that may be subsequently created or needed.

In step 280, the reporting tool receiving one or more datasets may create a report from the data provided in the datasets in response to the query identified or inferred in step 200. A report may format, organize, or present the data as a function of a characteristic of at least one dataset or of the identified or inferred query. In some embodiments, the reporting tool may automatically generate a report in response to the query. In some embodiments, the reporting tool may display information culled from a dataset in a report as a combination of text, tables, charts, graphs, audio, images, objects, videos, or other known electronic formats for presenting information.

In some embodiments, the reporting tool may generate a report as at least one component of a dashboard or by creating a dashboard as a function of the reporting of the at least one dataset. A dashboard may be a software-based control panel for one or more applications, network devices, or computing systems. The dashboard may display some or all of the requested report information and, in some embodiments, this information may be displayed as part of a graphical user interface (GUI). The dashboard may be a real-time user interface that includes graphical or animated depictions, representations, and information of the report. The dashboard may subsequently change or alter the information displayed in response to subsequent queries and requests made by a dashboard user for additional information or information that is different than data that is currently being displayed by the dashboard. When requests or queries are made at the dashboard level, the reporting tool may receive the query or infer a query as described in step 200, and then repeat the method of FIG. 2 in order to generate a new or updated report.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A computerized ETL-based reporting tool comprising a processor, a memory coupled to the processor, and a computer-readable hardware storage device coupled to the processor, the storage device containing program code for a reporting tool configured to be run by the processor via the memory to implement a method for generating an ETL-based report, the method comprising:
   the reporting tool inferring a data query as a function of receiving information input;
   the reporting tool identifying multiple data sources containing retrieved data needed to respond to the inferred query, where at least two of the multiple data sources do not store data in homogeneous formats;
   the reporting tool selecting a set of Extraction, Transform, and Load (ETL) code;
   the reporting tool launching the ETL code, where the ETL code extracts, transforms and loads the retrieved data from the at least two data sources, such that the transformed data consists of at least two datasets that represent data in a consistent format;
   the reporting tool receiving, as a function of the ETL code, the at least two datasets as real-time streaming data; and
   the reporting tool creating a report as a function of the at least one dataset,
      where the report is an animated, interactive dashboard that is continuously updated in real time with the streaming data.

2. The reporting tool of claim 1, further comprising the reporting tool generating the ETL code as a function of the data query.

3. The reporting tool of claim 1, where the selecting is performed as a function of a predefined rule.

4. The reporting tool of claim 1, further comprising:
   the reporting tool provisioning an allocation of resources to a computing environment running the ETL code, where the launching of the ETL code occurs as a computer application within the computing environment, where the resources are local, network, or cloud based resources; and
   the reporting tool, deprovisioning the allocation of resources of the computing environment.

5. The reporting tool of claim 1, where the one or more data sources are selected from the group consisting of a web service, an application, an unstructured file, a flat file, a database, a mainframe, a messaging service, and a combination thereof.

6. A method for generating an ETL-based report, the method comprising:
 a computerized ETL-based reporting tool accepting information input, where the computerized ETL-based reporting tool comprises a processor, a memory coupled to the processor, and a computer-readable hardware storage device coupled to the processor, the storage device containing program code for the ETL-based reporting tool configured to be run by the processor via the memory to implement the method for generating the ETL-based report;
 the reporting tool inferring a data query as a function of receiving information input;
 the reporting tool identifying multiple data sources containing retrieved data needed to respond to the inferred query, where at least two of the multiple data sources do not store data in homogeneous formats;
 the reporting tool selecting a set of Extraction, Transform, and Load (ETL) code;
 the reporting tool launching the ETL code, where the ETL code extracts, transforms and loads the retrieved data from the at least two data sources, such that the transformed data consists of at least two datasets that represent data in a consistent format;
 the reporting tool receiving, as a function of the ETL code, the at least two datasets as real-time streaming data; and
 the reporting tool creating a report as a function of the at least one dataset,
  where the report is an animated, interactive dashboard that is continuously updated in real time with the streaming data.

7. The method of claim 6, further comprising the reporting tool generating the ETL code as a function of the data query.

8. The method of claim 6, where the selecting is performed as a function of a predefined rule.

9. The method of claim 6, further comprising:
 the reporting tool provisioning an allocation of resources to a computing environment, where the launching of the ETL code occurs as a computer application within the computing environment, where the resources are local, network, or cloud based resources; and
 the reporting tool deprovisioning the allocation of resources of the computing environment.

10. The method of claim 6, where the one or more data sources are selected from the group consisting of a web service, an application, an unstructured file, a flat file, a database, a mainframe, a messaging service, and a combination thereof.

11. The method of claim 6, where the selecting further comprises the reporting tool applying one or more filters to the ETL code.

12. The method of claim 6, further comprising providing at least one support service for at least one of creating, integrating, hosting, maintaining, and deploying computer-readable program code in the computer system, where the computer-readable program code in combination with the computer system is configured to implement the steps of inferring, identifying, selecting, launching, receiving and creating.

13. A computer program product, comprising a computer-readable hardware storage device having a computer-readable program code stored therein, the program code configured to be executed by a computerized ETL-based reporting tool comprising a processor, a memory coupled to the processor, and a computer-readable hardware storage device coupled to the processor, the storage device containing program code for the reporting tool configured to be run by the processor via the memory to implement a method for generating an ETL-based report, the method comprising:
 the reporting tool inferring a data query as a function of receiving information input;
 the reporting tool identifying multiple data sources containing retrieved data needed to respond to the inferred query, where at least two of the multiple data sources do not store data in homogeneous formats;
 the reporting tool selecting a set of Extraction, Transform, and Load (ETL) code;
 the reporting tool launching the ETL code, where the ETL code extracts, transforms and loads the retrieved data from the at least two data sources, such that the transformed data consists of at least two datasets that represent data in a consistent format;
 the reporting tool receiving, as a function of the ETL code, the at least two datasets as real-time streaming data; and
 the reporting tool creating a report as a function of the at least one dataset,
  where the report is an animated, interactive dashboard that is continuously updated in real time with the streaming data.

14. The computer program product of 13, further comprising the reporting tool generating the ETL code as a function of the data query.

15. The computer program product of 13, where the selecting is performed as a function of a predefined rule.

16. The computer program product of 13 further comprising:
 the reporting tool provisioning an allocation of resources to a computing environment, where the launching of the ETL code occurs as a computer application within the computing environment, where the resources are local, network or cloud based resources; and
 the reporting tool, deprovisioning the allocation of resources to the computing environment.

17. The computer program product of claim 13, where the selecting further comprises the reporting tool applying one or more filters to the ETL code.

* * * * *